(12) United States Patent
Moura et al.

(10) Patent No.: US 8,574,347 B2
(45) Date of Patent: Nov. 5, 2013

(54) PSA PROCESS, AN EQUIPMENT ARRANGEMENT FOR HEAT EXCHANGE AND A PROCESS OF THERMAL ENERGY RECOVERY IN SAID PSA PROCESS

(75) Inventors: Adler Gomes Moura, Santa Barbara D'Oeste SP (BR); Daniel Moozydlower, Laranjeiras RJ (BR)

(73) Assignees: Siemens LTDA, Sao Paulo SP (BR); Dedini S/A Industrias de Base, Piracicaba (BR)

( * ) Notice: Subject to any disclaimer, the term of this patent is extended or adjusted under 35 U.S.C. 154(b) by 595 days.

(21) Appl. No.: 12/524,123

(22) PCT Filed: Jan. 22, 2007

(86) PCT No.: PCT/BR2007/000011
§ 371 (c)(1),
(2), (4) Date: Dec. 14, 2009

(87) PCT Pub. No.: WO2008/089527
PCT Pub. Date: Jul. 31, 2008

(65) Prior Publication Data
US 2010/0083829 A1    Apr. 8, 2010

(51) Int. Cl.
*B01D 53/02* (2006.01)
(52) U.S. Cl.
USPC .................................. 95/96; 95/114; 96/143
(58) Field of Classification Search
USPC ........................... 95/96, 114, 23; 96/108, 143
See application file for complete search history.

(56) References Cited

U.S. PATENT DOCUMENTS 3,751,878 A    8/1973  Collins
5,453,112 A    9/1995  Sinicropi et al.

FOREIGN PATENT DOCUMENTS

| EP | 0 042 159 A1 | 12/1981 |
| EP | 0 092 208 A2 | 10/1983 |
| EP | 1 327 823 A2 | 7/2003 |
| JP | 04275904 A * | 10/1992 |

OTHER PUBLICATIONS

International Search Report and Written Opinion from International Application No. PCT/BR2007/000011, mailed Oct. 10, 2007.
International Preliminary Report on Patentability from International Application No. PCT/BR2007/000011, mailed Jul. 1, 2009.

\* cited by examiner

*Primary Examiner* — Robert A Hopkins
(74) *Attorney, Agent, or Firm* — Alston & Bird LLP (57) ABSTRACT

The present invention relates to a pressure swing adsorption process, also known as PSA process, which is modified with a view to utilizing the heat from the post-adsorption stream coming from the molecular sieves to heat/vaporize the pre-adsorption stream containing the hydrated product or the mixture component(s) to be adsorbed in said sieves. The present invention provides alternative arrangements for the heat exchanger system in order to use the thermal potential of the post-adsorption stream with the elimination or minimization of the risk of a slug flow regime in the exchangers, the so-called "gush," which would be a natural result from the periodic oscillation characteristic of PSA processes. With this, the vapor consumption with the modified process according to the present invention is considerably reduced.

18 Claims, 7 Drawing Sheets

PSA PROCESS, AN EQUIPMENT ARRANGEMENT FOR HEAT EXCHANGE AND A PROCESS OF THERMAL ENERGY RECOVERY IN SAID PSA PROCESS

FIELD OF THE INVENTION

The present invention relates to systems for removing impurities from gases and vapors present in a starting solution, through pressure swing adsorption (PSA) processes.

Pressure swing adsorption is a process applied for the purification of gases, wherein impurities are removed by adsorption in suitable, fixed adsorbent beds contained in pressurized vessels.

Adsorption is the process through which atoms, molecules or ions are retained on the surface of solids by means of interactions of chemical or physical nature, forming layers on these surfaces and leaving mixtures composed of more than one substance depleted in the retained substance. Thus, the original gas mixture is purified from certain substances and enriched in the content of the substances that were not adsorbed.

With the increase in the pressure, there is a consequent increase in the adsorption of gases and vapors. Therefore, if a gas stream containing impurities susceptible to interactions with the adsorbent material passes through an adsorbent bed at higher than atmospheric pressures, it will be purified from these adsorbed impurities and enriched in the gas components. This purification process mainly depends on the selectivity in the adsorption of each component by the adsorption material at each pressure level.

Pressure swing adsorption processes make it possible to change bed pressure, enabling the desired purification of the initial stream and the adsorption of impurities.

In these systems, there are at least two adsorbent beds in different vessels having reverse pressurization concurrently.

While one of the beds is pressurized in order to adsorb impurities, the other bed is depressurized, regenerating the adsorbent, from where the adsorbed material is desorbed. In a stationary state, one bed is pressurized for adsorption and the other is depressurized for regeneration and consequent pressurization, while the first then passes to regeneration, thus keeping a cycle wherein the adsorbents alternate in adsorption and regeneration. The number of adsorption beds is determined by technical and economical criteria according to the plant's production capacity.

The commonly used adsorbent beds are called molecular sieves, made of resins, zeolites and other materials with good adsorbent capacity.

BACKGROUND OF THE INVENTION

PSA systems were firstly implemented for the purification of hydrogen. Since its commercialization, however, this type of process has reached greater industrial importance and better economic adaptation, becoming the object of purification of different substances, such as, for instance, in the production of anhydrous alcohol, in obtaining oxygen for hospital use, in the production of nitrogen with low impurity content, among others.

The following documents are herein described as prior-art references with regard to pressure swing adsorption (PSA) processes:

U.S. Pat. No. 4,407,662 discloses a process for removing water from hydrated ethanol, comprising the steps of heating the ethanol/water mixture until it is a vapor with sufficient superheat to maintain the vapor phase and prevent substantial capillary adsorption, as the mixture passes through a dessicant bed of molecular sieves; passing the superheated ethanol/water mixture through the bed to remove sufficient water in order to increase the ethanol content in the mixture; passing a portion of the dehydrated ethanol through a second dessicant bed of molecular sieves at less than atmospheric pressure to desorb the water and ethanol on the dessicant bed from a previous dehydration cycle, and reversing the flow through the two beds, after the temperature of the first bed increases.

Patent FR 2719039 A1 discloses a process for dehydration of a water/ethanol mixture by adsorption/regeneration on a molecular sieve, comprising the steps of vaporizing and superheating the mixture; passing the mixture in the vapor state over a molecular sieve to cause adsorption of water into the molecular sieve; and concurrently and/or alternately effecting regeneration by subjecting part of the dehydrated ethanol to a supplementary stage of superheating and passing it at a pressure below atmospheric pressure over a molecular sieve that is saturated with water to desorb the adsorbed water.

U.S. Pat. No. 5,753,010 discloses a method for increasing product recovery or reducing the size of pressure swing adsorption systems (PSA) utilized for hydrogen production.

U.S. Pat. No. 5,961,694 discloses a system for the separation of a gas mixture by pressure swing adsorption (PSA) comprising one adsorber and a first vessel which can be selectively connected to the adsorber in order to temporarily store the gas which is extracted from the adsorber and reintroduced into it during a cycle.

U.S. Pat. No. 6,156,101 discloses a PSA process that utilizes a combination of cyclic feed, evacuation, purge, and repressurization steps to provide a final gas product enriched in one of the feed components.

U.S. Pat. No. 6,340,382 B1 discloses a PSA process of adsorbing substantially all of the nitrogen and other contaminants from a hydrogen stream, in order to obtain purities of about 99.9% from the gas.

U.S. Pat. No. 6,746,515 B2 describes thermally-enhanced pressure swing adsorption (PSA) processes.

Although they are part of the prior art, none of the above-mentioned references describes or suggests the present invention as herein disclosed and claimed.

OBJECT OF THE INVENTION

The PSA process of dehydration or component separation by means of molecular sieves basically consists of a system of evaporators, coupled to a set of at least two molecular sieves. The hydrated product or the mixture of components, herein called "liquid pre-adsorption stream" is vaporized at a certain pressure in the evaporators, thus forming the herein called "vaporized pre-adsorption stream." The pre-adsorption stream passes to the molecular sieves, wherein water or one of the components is adsorbed, producing the anhydrous product or the separate component, thus forming the herein called "post-adsorption stream" which is condensed with cooling water and sent to tankage.

The object of the present invention is to modify this process in order to recover energy from the post-adsorption stream, which is currently condensed without utilizing its thermal potential.

According to the present invention, the PSA process is modified with a view to utilizing the heat from the post-adsorption stream coming from the molecular sieves in order to heat/vaporize the liquid pre-adsorption stream containing the hydrated product or the mixture component to be adsorbed in said sieves.

DESCRIPTION OF THE INVENTION

The major modification in the process consists of sending the post-adsorption stream to the evaporator of the liquid pre-adsorption stream. The pressure of the post-adsorption stream has to be higher than the current pressure in order to ensure a sufficient thermal gradient for the evaporator's design to be both technically and economically feasible. For this reason, the present invention includes a compressor at the outlet of the evaporator of the liquid pre-adsorption stream. The increase in pressure and temperature in this stream implies a higher pressure and temperature of the post-adsorption stream, which is responsible for the evaporator load. With this, the consumption of hot utility with the modified process according to the present invention is considerably reduced.

Figure 1:
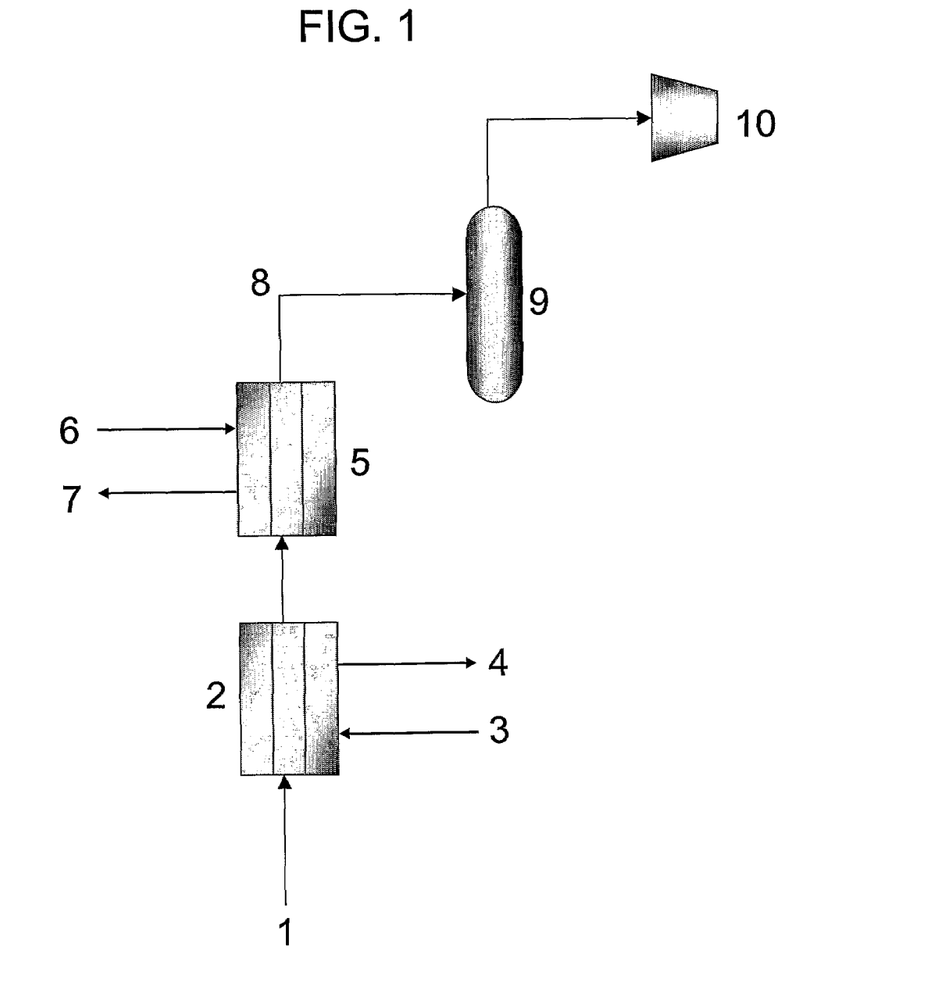
FIG. 1 shows an arrangement of heat exchangers in series for a liquid pre-adsorption stream in accordance with an embodiment of the invention.

For example, an arrangement of heat exchangers in series for a liquid pre-adsorption stream according to the present invention is shown in FIG. 1. In this embodiment of the present invention, a first liquid stream heater is used having as hot fluid the post-adsorption stream condensed in an evaporator, herein called "EV-1." The outlet stream is heated again in a second heater using a hot utility (steam, for example). A second evaporator, herein called "EV-2," is used to complement the vaporization service of the liquid stream which is not completed in EV-1.

Preferably, EV-1 and EV-2 are evaporators of shell and tube type.

If there is a change in the feed flow rate of the EV-1 shell, there is an extremely fast pressure drop in the EV-1 shell. The temperature of the EV-1 shell reacts with the same dynamics of the pressure in order to keep the balance between the existing phases in the stationary state. The temperature in the EV-1 shell approaches the temperature in the tubes, which implies a reduction of the heat exchange in EV-1. It is noted that the periodic variation of the feed flow rate of the EV-1 shell is a characteristic inherent to PSA processes (periodic oscillation of the post-adsorption flow rate).

There is also pressure variation in the heat exchanger tubes. This variation is due to a reduction in the vapor flow rate that reaches the vessel downstream from the second evaporator, since this vessel defines the pressure throughout the exchanger tubes. The amount of vaporized liquid in EV-1 is drastically reduced. The vapor fraction in the EV-1 outlet has a lower reduction when the change in the feed flow rate of the EV-1 shell is more attenuated.

There is a small reduction in the total outlet flow rate of EV-1 as a result of a reduction in the vaporized fraction of the pre-adsorption stream. However, the recovery of the vaporized fraction profile in the tubes when back to the stationary state provides a significant increase in the normal flow rate value. This effect is called "gush." With a more attenuated change in the feed flow rate of the EV-1 shell, it is noted that the gush is smoother, but still significant.

The change in the vaporized fraction profile in the tubes is responsible for causing the "gush." With a reduction in heat exchange, there is a tendency to accumulate a mass of liquid in the tubes; when the heat exchange is restabilized, this accumulated liquid needs to be expelled in order to reestablish the stationary profile of the vapor fraction.

The "gush" effect associated with the load loss effects due to the stream in the tubes or equipment vibration has a very strong impact on the system, compromising the operation of EV-2 and certainly rendering unfeasible the control of the stable thermal load of the evaporation of the liquid pre-adsorption stream. This is one of the problems solved by the present invention.

The vapor fraction profile at the EV-2 outlet is similar to the profile in EV-1. When the feed flow rate of the EV-1 shell is changed, there is a significant stream of liquid leaving the last evaporator. That is why there is the need for a separator vessel to avoid disturbances in the operation of the compressor downstream from the evaporation system, as well as to avoid the possibility of passing the liquid pre-adsorption stream material to the molecular sieves.

When back to the stationary state in the exchangers, the "gush" occurs in the EV-2 tubes, due to the reestablishment of the original post-adsorption flow rate in the EV-1 shell. The "gush" to EV-2 must be weakened by a separation vessel in order to prevent the pre-adsorption stream material from reaching the compressor in the liquid state.

The mass flow rate through the compressor varies a little in relation to the value of the stationary state during the change in the feed flow rate of the EV-1 shell. This weakening is due to the presence of a separation vessel at the compressor inlet, which theoretically would ensure stability in the feeding of the sieves during the whole cycle, given the hypothesis that there would not be liquid accumulation in the vessel, that is, that the "gush" liquid could be immediately drained. This theoretical behavior may be rendered unfeasible in practice according to the intensity of the "gush."

DETAILED DESCRIPTION OF THE INVENTION

As may be seen above, the greatest difficulty related to the modification proposed by the present invention is the periodic disturbance of the post-adsorption flow rate, which generates instability in the thermal load for the vaporization of the liquid pre-adsorption stream. The reason for this disturbance is the operation of changing sieves, which is characteristic of a PSA system.

To try to solve this problem, an embodiment with two vertical Shell and Tube type heat exchangers in series was tested, with a separation vessel after the second exchanger. This exchanger system is based on the current operation of the molecular sieve. The major advantage of this system is to approximately maintain the current equipment configuration.

In this system of heat exchangers, the post-adsorption stream from the sieves in the shell of the first heat exchanger (EV-1) provides the heat needed for the partial evaporation of the liquid pre-adsorption stream, which circulates in the tubes. The total evaporation of this stream is obtained through hot utility (steam, for instance) in the second heat exchanger (EV-2). During the drop of the post-adsorption flow rate to the EV-1 shell, the total evaporation in EV-2 is preferably ensured by a control system, which opens an inlet valve of hot utility in EV-2, increasing the thermal load of this exchanger.

The greatest concern in this embodiment relates to the flow regime of the biphasic material from one exchanger to the other, especially during the change in the post-adsorption flow rate in the shell of the first exchanger. There is a high probability of this change being associated with unstable flow regimes, such as the "slug" type (intermittent liquid and vapor slugs), which could compromise the system operation, specially that of EV-2 and the compressor.

Figure 2:
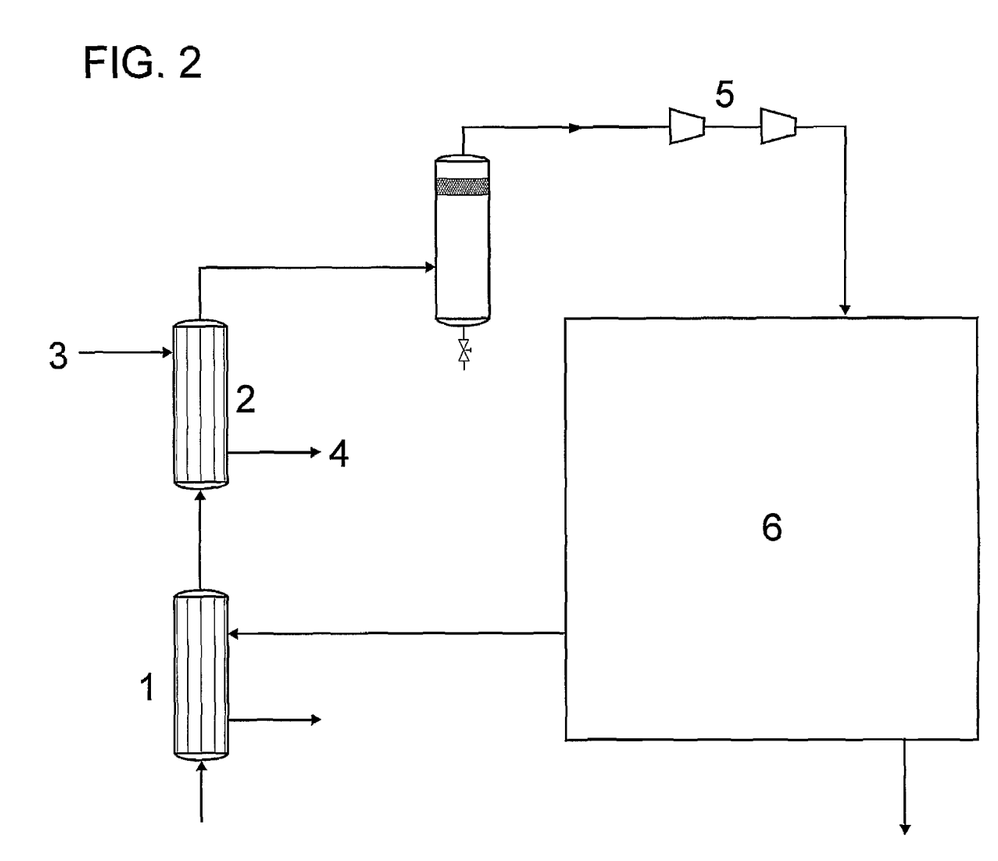
FIG. 2 shows a PSA system having two vertical Shell and Tube type heat exchangers in series in accordance with an embodiment of the invention.

A flow diagram exemplifying this attempt to solve the problem is shown in FIG. 2, which shows the arrangement with two vertical Shell and Tube type heat exchangers in series in a PSA process.

However, the embodiment with two vertical Shell and Tube type heat exchangers in series, although attractive from the point of view of small modifications to the current layout, was not found to be satisfactory due to the risk of a slug flow regime in the exchangers, causing the so-called "gush," associated with the pressure disturbances inherent to the PSA system.

The present invention presents a solution to the problems mentioned above by means of 4 alternative arrangements for the heat exchanger system in order to use the thermal potential of the post-adsorption stream with the elimination or minimization of the so-called "gushes":

1) Two vertical Shell and Tube heat exchangers in parallel with a downstream separation vessel.
2) A single Kettle type heat exchanger.
3) A heat exchange system using thermal oil.
4) A surge tank after the arrangement of molecular sieves.

In all these arrangements, there is a compressor downstream from the last evaporator to elevate the pre-adsorption stream pressure, thus rendering feasible the use of heat.

It should be noted that the present invention may also be carried out using a pre-adsorption stream in vapor form, as in the cases of separation or purification of gas mixtures. In this case, there is no need to have the same amount of heat exchangers than the one used when the pre-adsorption stream is in liquid form, causing a simplification of the energy recovery process according to the present invention. Therefore, the fact that the pre-adsorption stream is in liquid form is only a preferable embodiment of the present invention, which also includes in its scope a pre-adsorption stream in vapor form. In this specific case, though, the following conditions need to be satisfied:

The post-adsorption stream should be condensed at some time;

There is a stream available to receive the heat to be transferred by the condensation of the post-adsorption stream.

Each of the preferred embodiments mentioned above to carry out the invention will be described below:

1) Two Vertical Shell and Tube Type Heat Exchangers in Parallel

The arrangement with two exchangers in parallel was proposed with a view to eliminating the concern with the biphasic flow between the exchangers on the tube side and eliminate the "gush" problem. The pre-adsorption flow rate is then divided between the heat exchangers. One of the exchangers uses the post-adsorption stream again in the shell (EV-1) evaporating a certain flow rate of the pre-adsorption stream while the other uses hot utility (EV-2).

During the drop in the post-adsorption flow rate of EV-1, a control system causes a reduction in the pre-adsorption flow rate going to EV-1 and an increase in the flow rate going to EV-2, while increasing the hot utility flow rate to EV-2. Thus, the pre-adsorption flow rate of saturated vapor would be kept constant at the outlet of the heat exchanger system so as not to disturb the downstream process. However, this flow division control should be perfectly adjusted not to generate oscillations in the system. This adjustment is made difficult by the variation of the vaporized fraction profile in the EV-1 and EV-2 heat exchangers during the disturbance period.

Figure 3:
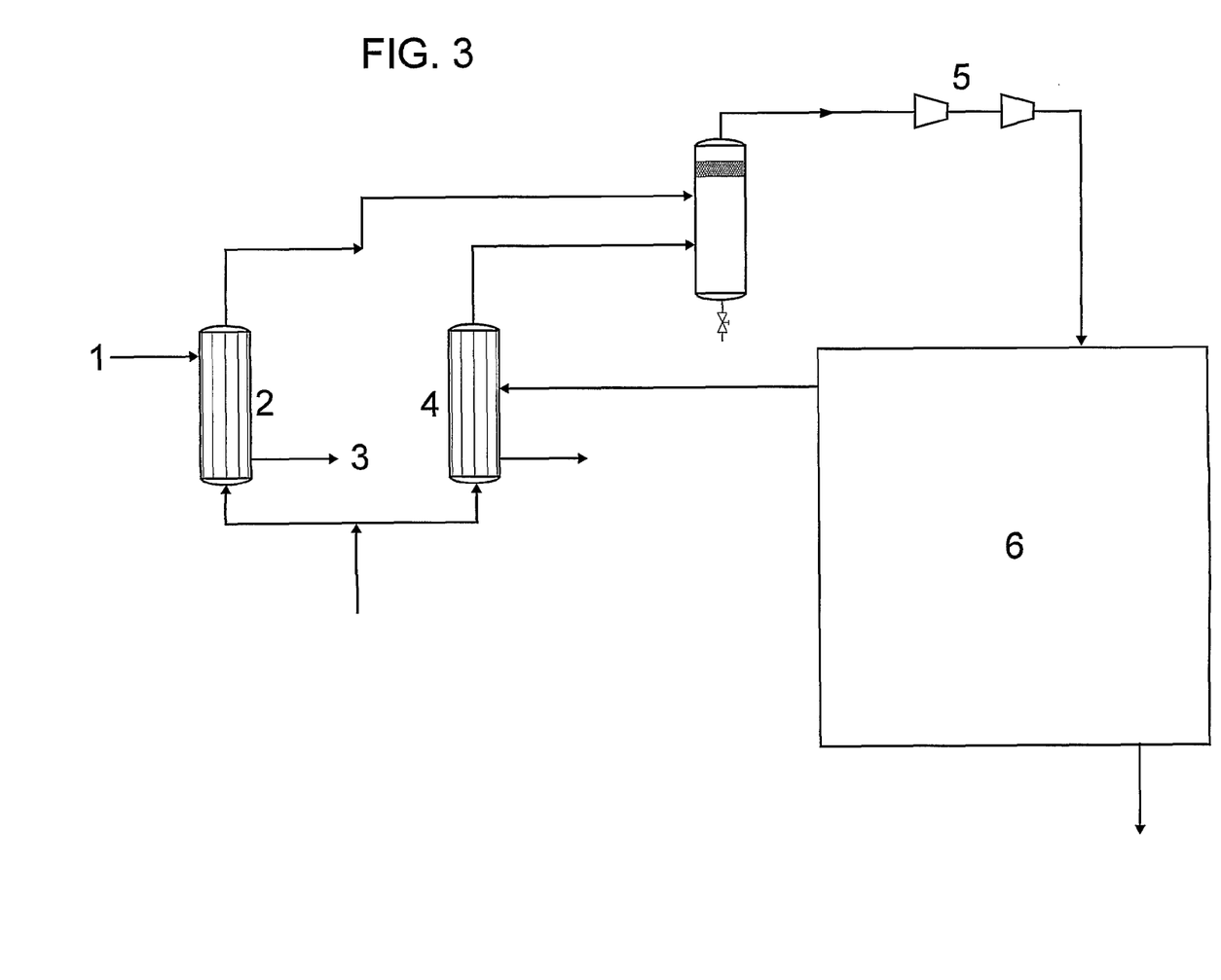
FIG. 3 shows a PSA system having two vertical Shell and Tube type heat exchangers in parallel in accordance with another embodiment of the invention.

A flow diagram exemplifying this arrangement with two vertical Shell and Tube type heat exchangers in parallel is shown in FIG. 3. This embodiment is described in Example 1 below (see Examples), which specifically relates to a PSA process for dehydrating alcohol to obtain anhydrous alcohol. However, the scope of the present invention should not be limited to this merely illustrative example nor only to PSA processes for obtaining anhydrous alcohol.

2) A Single Kettle Type Heat Exchanger (Best Mode of Execution of the Invention)

This embodiment is based on a single Kettle type heat exchanger. This heat exchanger has the heating fluids (post-adsorption stream/vapor) in two separate streams heating the pre-adsorption stream which is in the single shell of the exchanger.

The advantage of this heat exchanger is the thermal capacitance provided by the large volume of pre-adsorption stream material in the shell, which has a lower sensitivity to the post-adsorption flow rate variations.

Furthermore, compensating for a reduction in the post-adsorption flow rate with an increase in vapor flow rate is much quicker than in the previous alternatives, since both streams are transferring heat to the same reservoir of pre-adsorption stream material.

Figure 4:
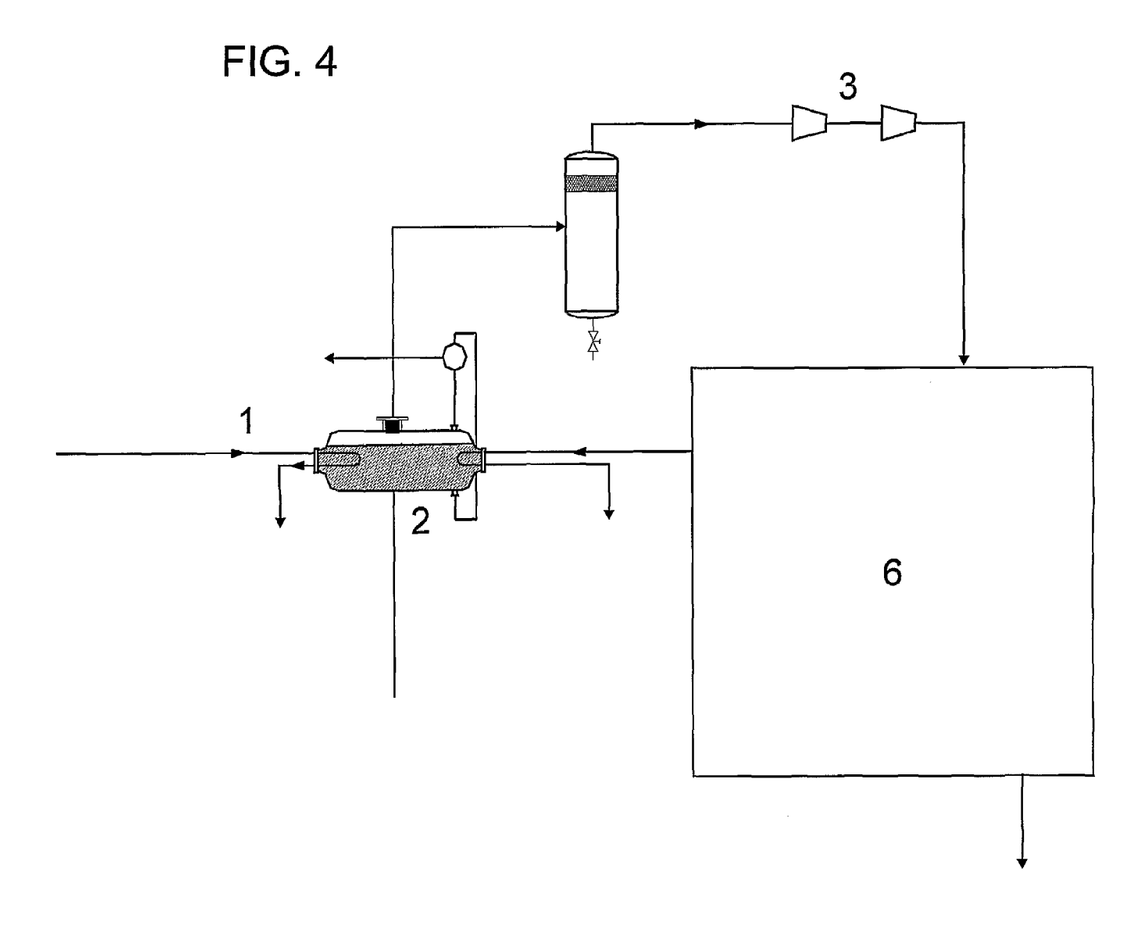
FIG. 4 shows a PSA system having a single Kettle type heat exchanger in accordance with a further embodiment of the invention.

A flow diagram exemplifying this arrangement with a single Kettle type heat exchanger is shown in FIG. 4. This embodiment is described in Example 2 below (see Examples), which specifically relates to a PSA process for dehydrating alcohol to obtain anhydrous alcohol. However, the scope of the present invention should not be limited to this merely illustrative example nor only to PSA processes for obtaining anhydrous alcohol.

3) A Heat Exchange System Using Thermal Oil

This embodiment using thermal oil aims at eliminating the change effect caused by the operation of the sieves in the heat exchangers. A change in the pre-adsorption flow rate is absorbed by liquid thermal oil, which condenses the post-adsorption stream. After stabilizing its temperature in a surge tank and still having this temperature controlled in a heat exchanger with hot utility (medium pressure vapor, for example), this thermal oil is used to vaporize the pre-adsorption stream.

This embodiment enables the use of the energy contained in the post-adsorption stream to vaporize the pre-adsorption stream, without disturbing the evaporator. If the working temperature range is low, that is to say, if the vaporization/condensation temperatures of pre-adsorption and post-adsorption streams are close to one another (which will depend on the pressure differential provided by the compressor), the use of a very large thermal oil flow rate is needed. Therefore, this flow rate may compromise the economic feasibility of this embodiment.

Figure 5:
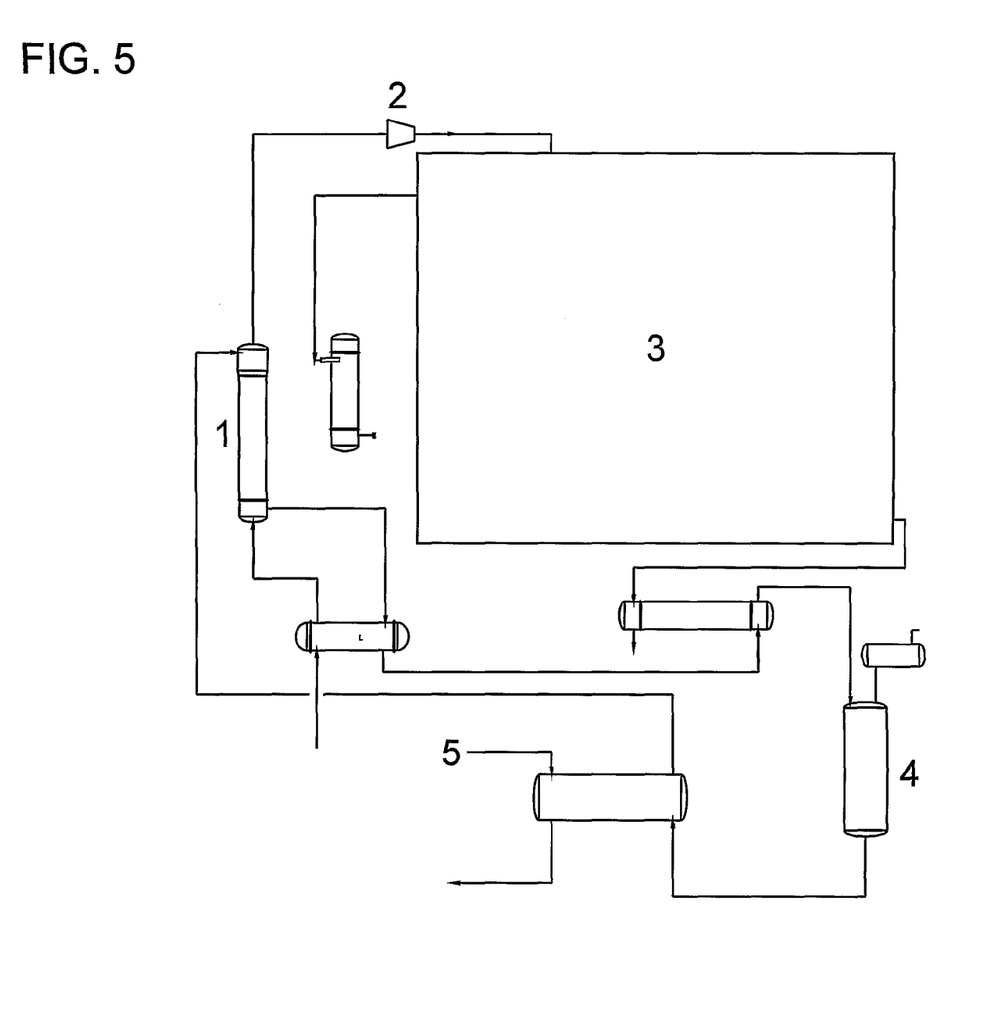
FIG. 5 shows a PSA system using thermal oil in accordance with another embodiment of the invention.

A flow diagram exemplifying this heat exchange arrangement using thermal oil is shown in FIG. 5. This embodiment is described in Example 3 below (see Examples), which specifically relates to a PSA process for dehydrating alcohol to obtain anhydrous alcohol. However, the scope of the present invention should not be limited to this merely illustrative example nor only to PSA processes for obtaining anhydrous alcohol.

4) A System Using a Surge Tank

This embodiment involves the installation of a surge tank downstream from a control valve located after the arrangement of molecular sieves. This system aims at stabilizing the post-adsorption flow rate before feeding the EV-2 evaporator. This surge tank absorbs any disturbance occurring in the post-adsorption flow rate in the form of pressure. A flow rate control system with a constant set point downstream from the tank ensures that a disturbance in the post-adsorption flow rate will not affect the heat exchangers.

With the objective of stabilizing the post-adsorption stream, this tank should have a sufficiently large volume so that, during a disturbance, its pressure drop does not render unfeasible the flow from the sieve system (higher pressure) to the heat exchange system (lower pressure). Typically, the volume of the tank may compromise the economic feasibility of this alternative. The allowable pressure drop is a direct function of the pressure differential provided by the compressor.

Figure 6:
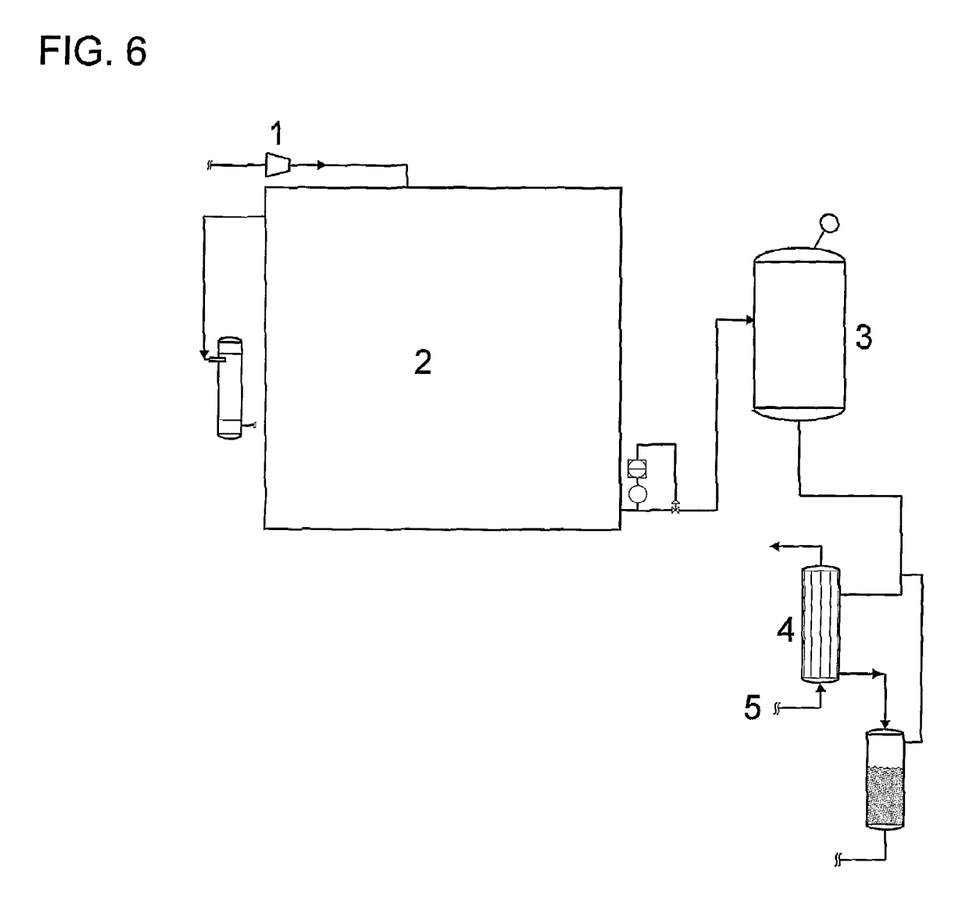
FIG. 6 shows a PSA system having a surge tank in accordance with yet another embodiment of the invention.

A flow diagram exemplifying this arrangement with a surge tank is shown in FIG. 6. This embodiment is described in Example 4 below (see Examples), which specifically relates to a PSA process for dehydrating alcohol to obtain anhydrous alcohol. However, the scope of the present invention should not be limited to this merely illustrative example nor only to PSA processes for obtaining anhydrous alcohol.

EXAMPLES

The 4 alternative arrangements for a heat exchanger system to use the thermal potential of the post-adsorption stream according to the present invention were carried out in a PSA process for dehydrating alcohol to obtain anhydrous alcohol:

The process of dehydrating alcohol in a molecular sieve consists of removing the water from the azeotrope formed by water and alcohol. The end product is ethanol with approximately 99.7% purity.

The azeotrope resulting from distillation is firstly heated in a heat exchanger (AQ-AL) up to its saturation temperature. Then, this stream feeds an evaporator. In this first EV-1 evaporator, a vertical Shell and Tube type heat exchanger, a large low-pressure vapor flow rate (escape vapor) is used to evaporate the azeotrope. This then passes to a second evaporator EV-2, a little smaller than the first one, utilizing medium pressure vapor to superheat the hydrated alcohol at the operation temperature of the sieves. As the resin from the molecular sieves cannot receive liquid droplets, the EV-2 outlet stream of superheated azeotrope further passes through a demister.

In the specific process in question, there are 3 molecular sieves that work in adsorption and desorption cycles in an alternating manner. There is always a sieve in desorption and two in adsorption. At each cycle there is an exchange between these sieves: the desorptive one is pressurized to enter into operation and one of the others is taken from operation to be regenerated. To be depressurized, the sieve is aligned with the vacuum system. At low pressures, the previously adsorbed water will be desorbed and the mixture formed by the alcohol atmosphere in the sieve and the water desorbed from the resin is evacuated to a system for reusing this mixture. This mixture is called phlegm and contains approximately 60% by mass of alcohol. The phlegm alcohol is recovered as hydrated alcohol and recirculated to the load tank of the dehydration unit.

The adsorption product stream passes from the sieves to a control valve, which is responsible for the pressure control of the entire system. The anhydrous alcohol stream is condensed to follow to a storage tank.

Due to the change of sieves for adsorption and desorption, the product line pressure varies. This pressure variation at the valve may be observed in the graph of FIG. 7.

Figure 8:
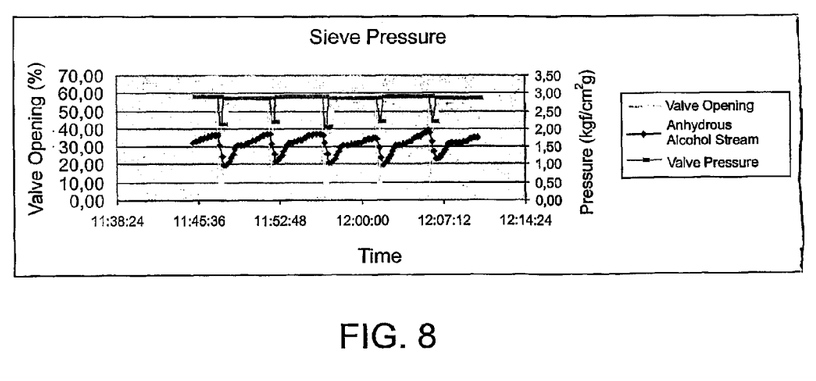
FIG. 8 is a graph showing valve opening as a function of line pressure and line flow rate in accordance with an embodiment of the invention.

The graph of FIG. 8 shows the behavior of the valve opening as a function of the line pressure and the line flow rate, which oscillates according to the opening of the valve.

The periodic oscillations of the system are related to the adsorption/desorption cycles of the sieves and basically impact the anhydrous and phlegm flow rates, which does not cause major operation impacts in the process in question.

Solution Proposed by the Present Invention

As previously described, the solution proposed by the present invention was carried out in a specific PSA process for dehydrating alcohol to obtain anhydrous alcohol. However, the present invention is not in any way limited to this process. Any PSA process may benefit from the present invention.

The alcohol dehydration process by means of molecular sieves used herein consists basically of a system with two vertical evaporators, coupled to a set of three molecular sieves. Hydrated alcohol is vaporized in the evaporators, using steam as hot fluid, and it flows to the molecular sieves, wherein water is adsorbed, producing anhydrous alcohol. The anhydrous alcohol is condensed with cooling water and sent to tankage.

The object of the present invention is to recover energy from the anhydrous alcohol stream, which, in the process in question, is condensed without using its thermal potential. The proposal is to use the heat from the anhydrous alcohol stream coming from the molecular sieves to heat/vaporize the hydrated alcohol to be adsorbed therein.

The major modification proposed by the present invention consists in sending the anhydrous alcohol stream to the hydrated alcohol evaporator. The anhydrous alcohol pressure should be higher than the current one, in order to ensure sufficient thermal gradient for the evaporator's design to be economically feasible. That is why a compressor is included at the outlet of the hydrated alcohol evaporator. The increase in pressure and temperature in this stream implies higher pressure and temperature of the anhydrous alcohol, which is responsible for the evaporator load.

Table 1 below shows that the heat load used in the current process is of about $2.70 \times 10^{10}$ J/h, and Table 2 below shows that the consumption of vapor with the process modified according to the present invention is approximately 20% of the current consumption (saving 80% of vapor).

TABLE 1

Consumption of vapor and heat load in the current process for producing 600 kL/d of anhydrous alcohol
Consumption of vapor in the current process

|  | Heat Load (J/h) | Vapor Flow Rate (kg/h) |
|---|---|---|
| Alcohol Heater | $5.67 \times 10^9$ | 2595 |
| EV-1 | $2.01 \times 10^{10}$ | 9200 |
| EV-2 | $1.27 \times 10^9$ | 625 |
| TOTAL | $2.70 \times 10^{10}$ | 12420 |

TABLE 2

Consumption of vapor and heat load in the process modified according to the present invention for producing 600 kL/d of anhydrous alcohol
Consumption of vapor in the modified process

|  | Heat Load (J/h) | Vapor Flow Rate (kg/h) |
| --- | --- | --- |
| Alcohol Heater-1 | $5.60 \times 10^9$ | 0 |
| Alcohol Heater-2 | $7.13 \times 10^8$ | 325 |
| EV-1 | $1.50 \times 10^{10}$ | 0 |
| "EV-2" | $4.78 \times 10^9$ | 2180 |
| TOTAL | $2.60 \times 10^{10}$ | 2505 |

In Table 2, alcohol heater 1 uses the anhydrous alcohol condensed in EV-1 as hot fluid elevating the temperature of the hydrated alcohol. The hydrated alcohol is heated up to saturation in alcohol heater 2 using hot utility (steam, for example). EV-2 is used to complement the vaporization service of the hydrated product which is not completed in EV-1.

As already mentioned, the greatest difficulty related to the proposed modification is the periodic disturbance of the anhydrous alcohol flow rate, which generates instability in the heat load for the vaporization of the hydrated alcohol. The reason for this disturbance is the operation of changing sieves, which is characteristic of a PSA system.

Examples 1 to 4 below describe the 4 alternative arrangements for a heat exchanger system proposed by the present invention to use the thermal potential of the anhydrous alcohol stream coming from the molecular sieves in order to heat/vaporize the hydrated alcohol to be adsorbed therein in a PSA process for obtaining anhydrous alcohol.

However, once again it should be pointed out that the illustrative examples presented below will serve to better describe the present invention. However, these examples merely relate to some embodiments of the present invention and should not be considered to be limiting the scope thereof.

In all the arrangements of heat exchanger system of Examples 1 to 4, there is a compressor downstream from the last evaporator to elevate the hydrated alcohol pressure from 4 to 6 kgf/cm², thus rendering feasible the use of heat.

EXAMPLE 1

Two Vertical Shell and Tube Type Heat Exchangers in Parallel with a Downstream Separation Vessel Example 1 is an embodiment of the solution previously disclosed in item 1.

The arrangement with two exchangers in parallel was proposed with a view to eliminating the concern with the biphasic flow between the exchangers on the tube side and possibly eliminate the "gush" problem. The hydrated alcohol flow rate is divided between the heat exchangers. One of the exchangers uses the anhydrous alcohol again in the shell (EV-1) evaporating a certain flow rate of hydrated alcohol, while the other uses vapor (EV-2).

During the drop in the anhydrous alcohol flow rate of EV-1, a control system causes a reduction in the hydrated alcohol flow rate going to EV-1, and an increase in the flow rate going to EV-2, while increasing the hot utility flow rate to EV-2. Thus, the hydrated alcohol flow rate of saturated vapor is kept constant at the outlet of the heat exchanger system so as not to disturb the downstream process. However, this flow division control should be perfectly adjusted not to generate oscillations in the system. This adjustment is made difficult by the variation of the vaporized fraction profile in the EV-1 and EV-2 heat exchangers during the disturbance period.

The alternative of using two vertical Shell and Tube type heat exchangers in parallel, although it requires attention from the point of view of control because of the need to control the flow rate between exchangers, substantially minimizes the "gushes" in the system, solving the problem that occurs when two vertical "BEM" type heat exchangers are used in series.

EXAMPLE 2

A Single Kettle Type Heat Exchanger (Best Mode of Execution of the Invention)

Example 2 is an embodiment of the solution previously disclosed in item 2.

This embodiment is based on a single Kettle type heat exchanger. This heat exchanger has the heating fluids (anhydrous alcohol/vapor) in two separate streams heating the hydrated alcohol which is in the single shell of the exchanger.

The advantage of this heat exchanger is the thermal capacitance provided by the large volume of hydrated alcohol in the shell, which has lower sensitivity to the anhydrous alcohol flow rate variations.

Furthermore, compensating for a reduction in the anhydrous alcohol flow rate with an increase in vapor flow rate is much quicker than in the previous alternatives, since both streams are transferring heat to the same reservoir of hydrated alcohol.

Therefore, the alternative of the single Kettle type heat exchanger has the advantage of having a more efficient control strategy to reject disturbances in the anhydrous alcohol stream.

EXAMPLE 3

A Heat Exchange System Using Thermal Oil

Example 3 is an embodiment of the solution previously disclosed in item 3.

This embodiment using thermal oil aims at eliminating the disturbance effect caused by the operation of the sieves in the heat exchangers. The disturbance in the stream of anhydrous alcohol is absorbed by the liquid thermal oil, which condenses anhydrous alcohol. After stabilizing its temperature in a surge tank and still having this temperature controlled in a heat exchanger with medium pressure vapor, this thermal oil is used to vaporize ethanol.

This system enables the use of the energy contained in the anhydrous alcohol stream to vaporize the hydrated alcohol, without disturbing the evaporator. However, as the working temperature range is low, that is, the vaporization/condensation temperatures of the hydrated and anhydrous streams are close to one another, the use of a very large thermal oil flow rate is needed.

Depending on the cost of the thermal oil circulation system and/or if there is a considerable difference between the evaporation pressure of the hydrated alcohol and the condensation pressure of the anhydrous alcohol, the use of the heat exchange system utilizing thermal oil according to the present invention may be perfectly satisfactory to reach the intended objectives. It should be noted that large pressure differences between the anhydrous alcohol and the hydrated alcohol imply a compressor with a higher cost.

EXAMPLE 4

A Surge Tank after the Arrangement of Molecular Sieves

Example 4 is an embodiment of the solution previously disclosed in item 4.

The system proposed in this alternative involves the installation of a surge tank downstream from the control valve PCV-101. This system was proposed with a view to stabilizing the anhydrous alcohol flow rate before feeding the EV-2 evaporator. This surge tank absorbs the anhydrous alcohol flow rate disturbance in the form of pressure. A flow rate control system with a constant set point downstream from the tank ensures that a disturbance in the anhydrous alcohol flow rate will not affect the heat exchangers.

With the objective of stabilizing the anhydrous alcohol stream, this tank should have a sufficiently large volume so that, during a disturbance, its pressure drop does not render unfeasible the flow from the sieve system (higher pressure) to the heat exchange system (lower pressure).

Having described examples of the invention with reference to its preferred embodiments, it is to be understood that the scope of the present invention embraces other embodiments and other PSA processes that are not for obtaining anhydrous alcohol, being limited solely by the appended claims.

Figure 7:
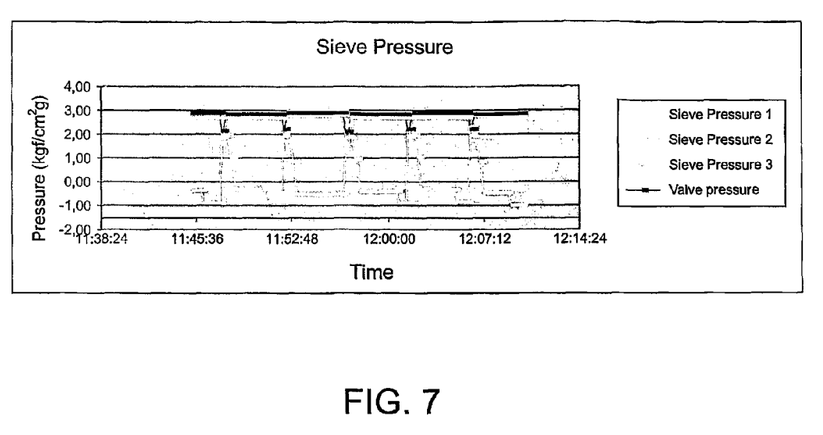
FIG. 7 is a graph showing variation of valve pressure and sieve pressure versus time in accordance with an embodiment of the invention.

The captions of FIGS. 1 to 8 of the drawings are listed below:

FIG. 1
1-Liquid pre-adsorption stream
2-EV-1 Evaporator
3-Post-adsorption vapor stream
4-Post-adsorption condensed stream
5-EV-2 Evaporator
6-Steam
7-Condensate
8-Vaporized pre-adsorption stream
9-Surge tank
10-Compressor FIG. 2
1-Shell & Tube Heat Exchanger
2-Shell & Tube Heat Exchanger
3-Vapor
4-Condensate
5-Compressors
6-Sieves FIG. 3
1-Vapor
2-Shell & Tube Heat Exchanger
3-Condensate
4-Shell & Tube Heat Exchanger
5-Compressors
6-Sieves FIG. 4
1-Vapor
2-Kettle Heat Exchanger
3-Compressors
4-Sieves FIG. 5
1-EV-1 Evaporator
2-Compressor
3-Sieves
4-Surge tank
5-Vapor FIG. 6
1-Compressor
2-Sieves
3-Surge tank
4-EV-1 Evaporator
5-Pre-adsorption stream FIG. 7
Sieve Pressure
Pressure (kgf/cm$^2$ g)
Time
Sieve Pressure 1
Sieve Pressure 2
Sieve Pressure 3
Valve pressure FIG. 8
Sieve Pressure
Valve Opening (%)
Time
Valve Opening
Anhydrous Alcohol Stream
Valve Pressure

The invention claimed is:

1. A pressure swing adsorption (PSA) process, comprising using molecular sieves, and heating a pre-adsorption stream before the pre-adsorption stream is fed into the molecular sieves, wherein most of the thermal energy needed for said heating is provided by condensation of a post-adsorption stream coming from the molecular sieves by means of an equipment arrangement for heat exchange, said equipment arrangement comprising at least two vertical Shell and Tube type heat exchangers in parallel.

2. A PSA process according to claim 1, characterized in that a separation vessel is arranged downstream from said at least two vertical Shell and Tube type heat exchangers in parallel.

3. A PSA process according to claim 1, characterized in that said equipment arrangement for heat exchange uses thermal oil.

4. A PSA process according to claim 3, characterized in that said thermal oil, after condensing the post-adsorption stream, flows to a surge tank and is then used to heat the pre-adsorption stream.

5. A PSA process according to claim 1, characterized in that said equipment arrangement for heat exchange comprises a system using a surge tank after the arrangement of molecular sieves and before the heat exchangers.

6. A PSA process according to claim 5 characterized in that a flow rate control system is arranged downstream from said surge tank.

7. A pressure swing adsorption (PSA) system, comprising molecular sieves, and a heat exchange system, said heat exchange system comprising at least two vertical Shell and Tube type heat exchangers in parallel and arranged so that most of the thermal energy needed for heating of a pre-adsorption stream being fed to the molecular sieves is provided by condensation of a post-adsorption stream coming from the molecular sieves by means of said heat exchange system.

8. The pressure swing adsorption (PSA) system according to claim 7, characterized in that a separation vessel is arranged downstream from said at least two vertical Shell and Tube type heat exchangers in parallel.

9. The pressure swing adsorption (PSA) system according to claim 7, the heat exchange system using thermal oil.

10. The pressure swing adsorption (PSA) system according to claim 9, characterized in that said thermal oil, after condensing the post-adsorption stream, flows to a surge tank and is then used to heat the pre-adsorption stream.

11. The pressure swing adsorption (PSA) system according to claim 7, characterized by comprising a system using a surge tank after the arrangement of molecular sieves and before the heat exchange system.

12. The pressure swing adsorption (PSA) system according to claim 11, characterized in that a flow rate control system is arranged downstream from said surge tank.

13. A process of thermal energy recovery in a pressure swing adsorption (PSA) process, comprising the steps of feeding a pre-adsorption stream to molecular sieves, and recovering thermal energy generated from condensation of a post-adsorption stream coming from the molecular sieves, said thermal energy being used for heating the pre-adsorption stream by means of an equipment arrangement for heat exchange comprising at least two vertical Shell and Tube type heat exchangers in parallel, wherein most of the thermal energy needed for said heating is provided by the condensation of the post-adsorption stream.

14. A process of thermal energy recovery according to claim 13, characterized in that a separation vessel is arranged downstream from said at least two vertical Shell and Tube type heat exchangers in parallel.

15. A process of thermal energy recovery according to claim 13, characterized in that said equipment arrangement for heat exchange uses thermal oil.

16. A process of thermal energy recovery according to claim 15, characterized in that said thermal oil, after condensing the post-adsorption stream, flows to a surge tank and is then used to heat the pre-adsorption stream.

17. A process of thermal energy recovery according to claim 13, characterized in that said equipment arrangement for heat exchange comprises a system using a surge tank after the arrangement of molecular sieves and before the equipment arrangement for heat exchange.

18. A process of thermal energy recovery according to claim 17, characterized in that a flow rate control system is arranged downstream from said surge tank.

* * * * *

UNITED STATES PATENT AND TRADEMARK OFFICE
CERTIFICATE OF CORRECTION

| | | |
|---|---|---|
| PATENT NO. | : 8,574,347 B2 | Page 1 of 1 |
| APPLICATION NO. | : 12/524123 | |
| DATED | : November 5, 2013 | |
| INVENTOR(S) | : Moura et al. | |

It is certified that error appears in the above-identified patent and that said Letters Patent is hereby corrected as shown below:

<u>On the Title page,</u>
Item (75) Inventors: "Daniel Moozydlower" should read --Daniel Moczydlower--.

Signed and Sealed this
Twenty-first Day of October, 2014

Michelle K. Lee
*Deputy Director of the United States Patent and Trademark Office*